United States Patent [19]

Tanner et al.

[11] Patent Number: 4,571,168

[45] Date of Patent: Feb. 18, 1986

[54] APPARATUS FOR THE COMPRESSION OF GRANULAR MATERIAL

[75] Inventors: Hans Tanner, Schaffhausen; Kurt Fischer, both of Schaffhausen, Switzerland

[73] Assignee: Georg Fischer Aktiengeselleschaft, Schaffhausen, Switzerland

[21] Appl. No.: 675,716

[22] Filed: Nov. 28, 1984

[30] Foreign Application Priority Data

Nov. 30, 1983 [CH] Switzerland .......................... 6394/83

[51] Int. Cl.³ ............................................... B29C 5/00
[52] U.S. Cl. .................................................. 425/405 R
[58] Field of Search ..................................... 425/405 R

[56] References Cited

U.S. PATENT DOCUMENTS 3,663,148 5/1972 Walker et al. .................... 425/405 R
3,892,506 7/1975 Dann et al. .................. 425/405 R X
4,286,937 9/1981 Abrens ......................... 425/405 R X

FOREIGN PATENT DOCUMENTS 1102978 3/1961 Fed. Rep. of Germany .
1097622 12/1963 Fed. Rep. of Germany .
2151949 4/1973 Fed. Rep. of Germany .

Primary Examiner—J. Howard Flint, Jr.
Attorney, Agent, or Firm—Marmorek, Guttman & Ruberstein

[57] ABSTRACT

An apparatus for the introduction of a gaseous medium into a chamber, especially for compressing casting molding material with a high-pressure gaseous medium supplied by a pressure vessel linked with the chamber by means of a valve system. The system has a seat having traversing openings which can be covered or uncovered by a stroke-activatable valve plate. The gaseous medium flows freely round the surface of the valve plate. The valve plate also is provided with traversing openings which, however, are displaceably arranged vis-a-vis the traversing openings of the valve seat. To trigger a pressure shock from the gaseous medium necessary to effect compression, an elevating mechanism for the valve is activated to lift the valve plate. The pressurized gaseous medium then flows round, as also throughout the valve plate and acts on the surface of the chamber.

12 Claims, 2 Drawing Figures

APPARATUS FOR THE COMPRESSION OF GRANULAR MATERIAL

BACKGROUND OF THE INVENTION

This invention relates to an apparatus for the introduction of a compressive gaseous medium into a chamber. The apparatus can be used, for example, to compress granular casting molding materials.

DESCRIPTION OF PRIOR ART DISCLOSURES

Arrangement of this type have been known in different forms of construction, including, for instance, that shown in German Pat. No. 1,097,622, in which a conical valve arrangement is used that can be activated by an elevating mechanism, by means of which an amount of pressure gas that is accumulated in a pressure chamber can be led over a mass of molding material. In German Pat. No. 21 51 949, a valve activated by pressurized gas is used, which is alternatedly connected to a gas source or to a molding box. The valve constitutes a cover that is locked at the top by a lid, in which cover the section that touches the molding compartment has a larger diameter than the section that protrudes into the hollow space. Openings are provided in the section with the smaller diameter in the radial direction and at angles to the longitudinal axis of the cover. These openings connect the cover area with the inside of the hollow space of the compartment, the pressurized gas triggering the compressive effect being led out of them.

One disadvantage of this embodiment is, above all, that only molding boxes with small areas can be used since only a passage of reduced cross-section for the pressurized gas is available. In order to also make available for larger molding surfaces the amount of gas necessary for compression effects within a required time, the gas pressure has to be relatively high, which, for reasons of safety of operation, is hardly feasible.

OBJECTS OF THE INVENTION

With a view to overcoming the above drawbacks of prior constructions, it is an object of this invention to provide an apparatus for the rapid introduction of a compressive fluid medium into a chamber. It is another object of the present invention to provide a valve system useful for relatively large-surfaced molding chambers, being simple to set up and resistant to wear and tear, and by means of which the amount of gas necessary for compressing the contents of the chamber can be suddenly provided and is reproducible onto the contents' surface at a minimum pressure through the largest possible traversing cross-section thereof.

BRIEF DESCRIPTION OF THE DRAWINGS

The above and other related objects, features and advantages of the present invention will be more readily understood from the accompanying description thereof, in particular, when taken together with the accompanying drawing showing by way of non-limiting examples best modes of the invention.

In the drawing.

DISCLOSURE OF THE BEST MODES OF THE INVENTION

Figure 1:
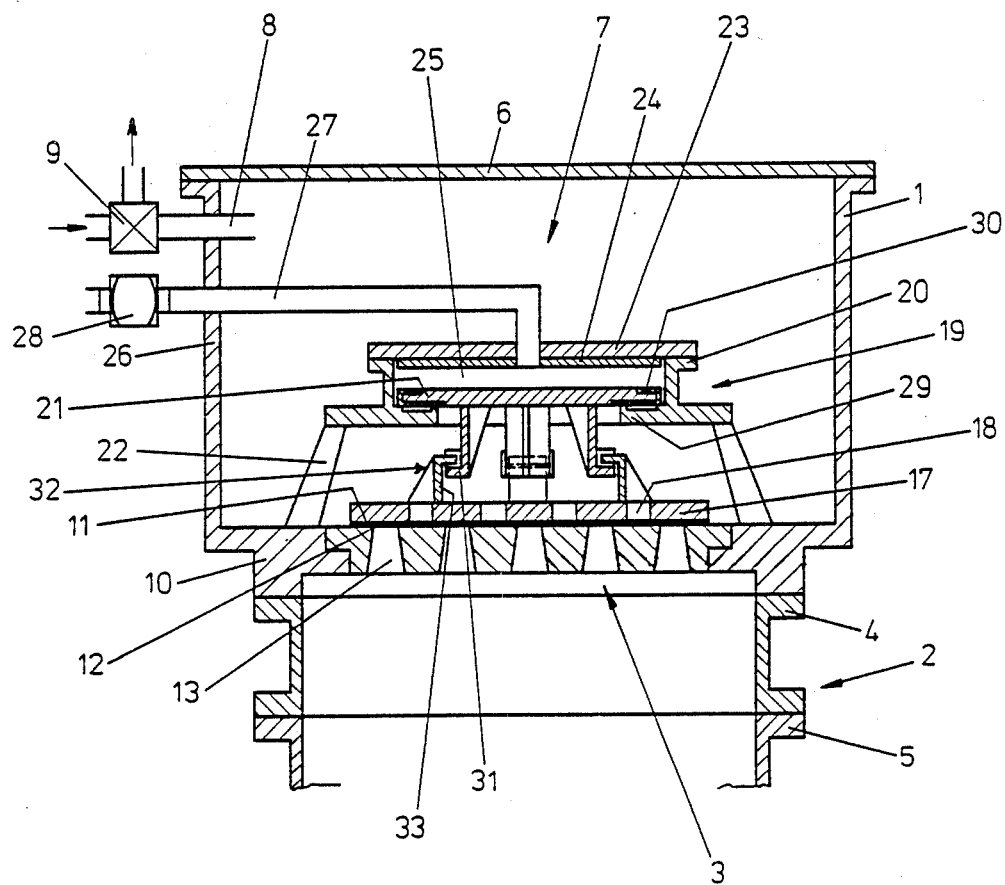
FIG. 1 is a vertical cross-section through an arrangement according to this invention having a valving arrangement with a dragging or tailing and lifting mechanism; and, FIG. 2 is a vertical cross-section through an alternative embodiment with a locking device in the lifting mechanism.

Referring descriptively to the drawing, FIG. 1 shows an arrangement suitable for compressing granular molding substances, which, in essence, consists of a pressure vessel 1 and a chamber 2 connectible to the vessel. The pressure vessel 1 is spatially separated from the molding arrangement 2 by means of valve 3, being pressure-tightly locked by means of the vessel lid 6. Chamber 2, which can be a molding arrangement, comprises a combination of a filling frame 4, molding boss 5 and a conventional molding plate (not shown), into which material to be compressed can be introduced in loose form.

The gaseous medium, for instance pressurized air, is led by the pressure line 8 laterally into the vessel area 7. Pressure tube 8 is provided with a regulating valve 9 by means of which the introduction of the amount of gas necessary to produce a pressure shock can be regulated. The pressure tube 8 is connected to a pressure tank (not shown) while the valve 9 is connected to a central control means.

In bottom 10 of the pressure vessel 1, i.e. at the place of the pressure vessel 1 to be connected with a chamber 2 containing material to be molded, there is inserted the plate-shaped valve seat 12 of valve 3, which very conveniently is formed so as to be exchangeable. Several openings 13 that run in the same direction are provided in the valve seat 12 forming the passage of valve 3. These may be widened in the direction of chamber 2 and may also be arranged radially.

A valve plate 17 is arranged on valve seat 12 and is provided with openings 18, displaceably arranged facing the traversing openings 13 of the valve seat 12. In order to ensure covering of the passage openings 13, 18 of the valve seat 12 and the valve plate 17, the distance between the individual openings 13, 18 is made larger than the dimensions of these openings.

The valve plate 17 is coated with a sealing material 11, for instance polyurethane on its bearing side. However, it is also possible to provide such a coating on the contact surface of the valve seat 12 instead of on valve plate 17, and on both the valve plate 17 and the valve seat 12, which will make it possible to also use (in the compression process) different sealing materials, for instance, synthetic rubber.

The valve plate 17 is arranged in such a way that free access along the valve plate 17 is possible to the whole surface. Thereby, when the valve plate 17 is lifted, the gaseous medium can flow through and circulate freely around the valve plate. Accordingly, passage of an optimal amount of pressure gas can thus be achieved even with reduced lifting of the valve.

In order to ensure the best flow-through in the passage openings 13, the cross-sections of the passage openings 13 at their edge zones may be selected larger than in the center zone.

A lifting mechanism 19 operating by a toggle effect is arranged over the valve plate 17 for its activation, which, in essence, consists of a compartment 20 and a piston plate 21 housed therein. As shown, the compartment 20 is connected to the bottom 10 of the pressure vessel 1 through several supports 22 and is covered by a lid 23.

The cover 24 is coated in its inner part in face of the piston plate 21 with an elastomer 24, for instance synthetic rubber or a similar material, which makes it possible to achieve a dampened lift of the piston plate 21. The compartment 20, the cover 23, elastomer 24 and the piston plate 21 define a so-called steering area 25 connected to a source of pressure gas through valve 28, line 27 passing through wall 26 of vessel 2.

The piston plate 21 inserted in compartment 20 lies tightly on a shoulder 29 of compartment 20, being at least partially coated with a sealing material 30, for instance polyurethane, to improve the sealing effect.

The lower part of piston plate 21 is provided with the tightly affixed carriers 31 with a hooked part 33 connected to the valve plate 17 which, on mutual engagement, forms a so-called drag coupling 32. A substance of relatively reduced friction is provided between the contact surfaces of the carriers 31 and the hooked part 33, in order, on the one hand, to produce a secure sealing of the piston plate 21 and of the valve plate 17 with minimum complications and expense, while also achieving a shock effect on a lifting of the valve plate 17.

In operation, the advantages of the apparatus accrue from the assumption that the molding chamber 2 filled with a molding substance is brought below the pressure vessel 1 and there tightly connected to pressure vessel 1. Through operation of valve 28 of the pressure line 27, the steering area 25 containing a predetermined amount of a gaseous medium is put under pressure, the piston plate 21 thereby being made to fit tightly onto shoulder 29 of compartment 20. Next, by adjusting valve 9, the vessel area 7 is supplied with a predetermined amount of a gaseous medium that flows through the line 8. It has been found convenient to keep the kind of medium, advantageously compressed air, and the pressure of the medium constant, which makes it possible to neglect reduced untightnesses on movement of the piston plate 21.

When a pressure impact for compression is to be released, the pressure in the steering or guide area 25 is reduced to such a degree over valve 28 through the line 27 that the force stemming from the pressure vessel and acting on the piston plate 27 exceeds that coming from the area 25.

When equilibrium is disturbed in the guide area 25, the surface uncovered by the piston plate 21 on the sealing shoulder 29 will suddenly act as an enlarged attacking surface because of pressure from piston plate 21. Thereby an instantaneous increase in the force from the vehicle area onto the piston plate 21 is produced. This will cause the piston plate 21 to lift the valve plate 17 from the valve seat 12 upwards whereupon the pressure gas stored in the pressure vessel 1 can stream out in a pressure shock through the openings 13. Since on formation of valve plate 17 as well as that of the passage openings 13 and 18 advantage is taken of a favorable flow capacity, and also the opening time and the lift are reduced, the sealing effect of the pressure shock unleashed is ensured.

Figure 2:
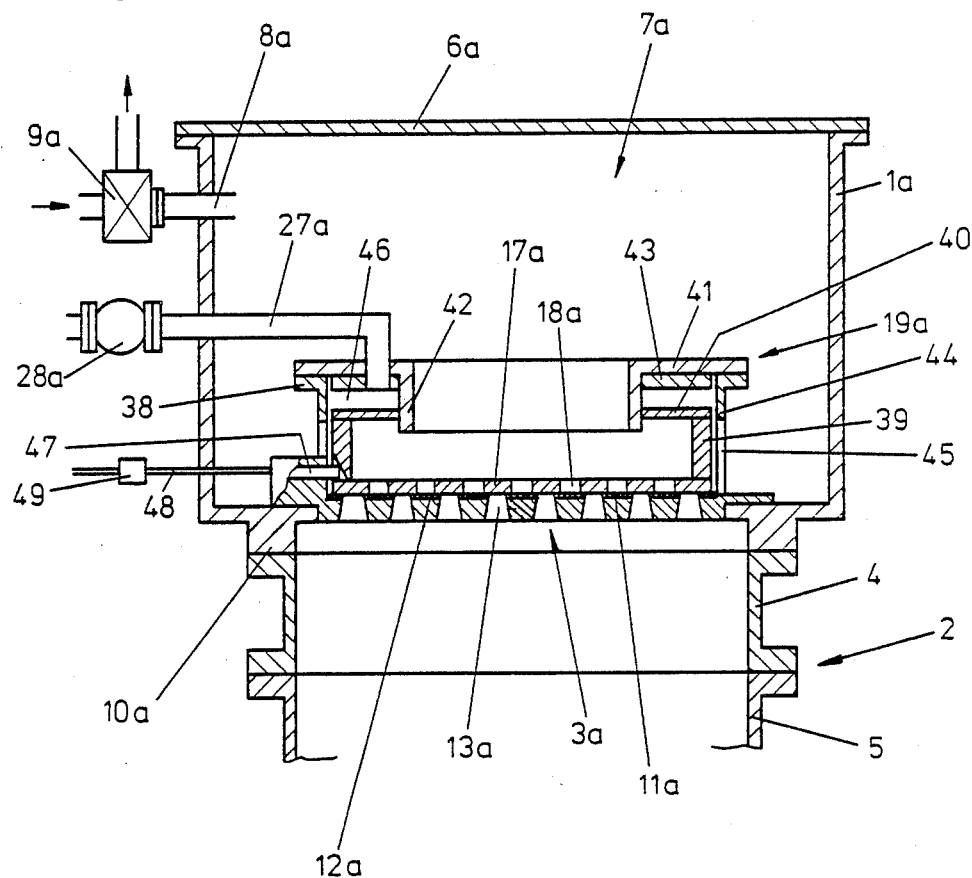

The embodiment illustrated in FIG. 2 differs from that shown in FIG. 1, generally considered, by the construction of valve 3a which consists in forming the valve seat 12a as a part of the guide compartment 38. As such, this compartment 38 or the valve seat 12a is inserted in the bottom 10a of the pressure vessel in a tight-fast, removable form. The pressure vessel 1a is sealed off tightly against the gas by means of a cover 6a and can be supplied with a gaseous medium through a line 8a and a control valve 9a.

Valve plate 17a rests on the valve seat 12, which plate is coated with a sealing material 11a, for instance, polyurethane, on the sealing side. Valve plate 17a is connected in a tight manner to a piston ring 40 through a tube-shaped distance keeper 39. Valve plate 17a, spacer 39 and piston ring 40 are slidably mounted, as a unit, in compartment 38 and, with compartment 38, form a lifting mechanism 19a. Valve plate 17a, similarly to that illustrated in FIG. 1, is provided with plate openings 18a which are displaceably arranged facing passage openings 13a of the valve seat.

The compartment 38 is covered by a lid 41 which in its center part is provided with a cylindrical part 42 that, at the same time, allows tight guidance of the piston ring 40 and thus functions as a thrusting piston drive. The passages of valve 3a are connected to the vessel area 7a through the opening of the cylindrical part 42, which makes unhampered circulation of the gaseous medium possible.

The compartment wall 41 is coated on the inside with a dampening material 43, for instance, synthetic rubber or meshed polyurethane for dampening the lift of the piston ring.

The wall 44 of the steering compartment 38 is provided with holes on the part facing the vessel compartment 7a in order to allow circulation by the gaseous medium round the valve plate 17a. The openings 43 are placed high enough so that a steering area 46 can be formed, defined by the cylindrical part 42, the steering compartment 48, the dampening material 43 and the ring piston 40. This steering area 46 is connected to a pressure source over line 27a and valve 28a.

At a certain height in the range of thickness of the valve plate 17a, there is arranged at least one lock 47 for stopping valve plate 17a, which lock can be operated by the pressure tube 48 and control mechanism 49. Compressed air is preferably used as processing medium. However, there may also be used an hydraulic medium, or the arrangement may be adapted for purely mechanical operation.

Operation of the above arrangement is substantially as described in relation to that of FIG. 1, in that a molding chamber 2 filled with molding substance is brought under the pressure vessel 1a, there being tightly secured with the pressure vessel 1a. Through adjustment of valve 28a of pressure tube 27a, the steering compartment 46 containing a given amount of a gaseous medium is put under pressure, causing the valve plate 17a to lie tightly against the valve seat 12a. Next, by opening valve 9a, the vessel area 7a is filled over pipe 8a with a predetermined amount of a gaseous medium, preferably compressed air. Here it has been found to be of advantage to select the same gaseous medium and the same pressure.

Thereafter, the locks 47 are affixed on the valve plate 17a in stop position, the arrangement now being ready to operate.

To trigger the pulsation or gas pressure shock necessary for compression, the gas pressure prevailing in the steering area 46 is lowered, preferably to the level of atmospheric pressure. After such a pressure is achieved, the locks 47 are simultaneously released, whereby the piston ring 40 in combination with the valve plate 17a are suddenly lifted under the effect of the over-pressure prevailing in the vessel area 7a vis-a-vis the guiding area 41. Thereby a passage is opened for the gaseous medium to flow from the pressure area 7a to the molding area. As a result of the shock-like movement operation of the valve arrangement, the pressurized gas exerts a pulsation shock.

Some of the special advantages that can be achieved with the use of this invention consist in that even relatively large sized traversing cross-sections can be kept flawlessly tight and that large amounts of pressure gas of different pressures, convertible into compressive impacts, can be employed. Further, since the valve arrangement consists of few movable parts, maximum resistance to wear and tear is achieved and thereby also an increase in operational safety. Since the valve plate is arranged so that the high pressure gaseous medium can flow round as well as throughout same, only a relatively small lift of the valve plate is necessary to allow full flow through its cross-section.

While the present invention has been described and shown with respect to particular embodiments thereof, it will be understood that the same is not limited thereto and that equivalents may be substituted for portions, without departing from its scope.

Having thus described the invention, what we claim is as follows:

1. Apparatus for the compression of granular molding materials comprising
   a pressure vessel connected to a source of pressurized compressive medium;
   a valve system in said pressure vessel;
   a molding chamber containing said granular materials and communicating with said valve system;
   said valve system including a valve seat having at least one traversing opening therethrough and a valve plate; said plate having at least one traversing opening arranged so as to allow covering and uncovering of said opening in said seat;
   a lifting mechanism operatively connected to said valve plate and to a source of pressurized fluid; and
   means for adjusting pressure on said plate to decrease pressure thereof against said valve seat to allow pressurized compressive medium to flow through and around said valve plate and into said molding chamber to compress said materials therein.

2. Apparatus according to claim 1, wherein said lifting mechanism includes a guide compartment, and a piston in said compartment connected to said valve plate, said compartment being connected to said source of pressure fluid and being movable as a result of a pressure differential between said pressures between said compartment and said pressure vessel.

3. Apparatus according to claim 2, wherein said lifting mechanism is connected to said valve plate by drag coupling means.

4. Apparatus according to claim 2, wherein said piston includes a plate having a sealing portion.

5. Apparatus according to claim 4, wherein said sealing portion has a friction-reducing coating thereon.

6. Apparatus according to claim 2, wherein said lifting mechanism is rigidly connected to said valve plate; said lifting mechanism having locking means releasable upon reaching the differential pressure between said guide compartment and said pressure vessel.

7. Apparatus according to claim 1, wherein said valve plate and said valve seats have a plurality of traverse openings.

8. Apparatus according to claim 7, wherein said openings in said valve seat and plate have substantially equal cross-sectional areas.

9. Apparatus according to claim 7, wherein said traversing openings in said valve seat are larger on their lower part than in their upper part.

10. Apparatus according to claim 7, wherein the distance between individual openings in said valve seat and valve plate is greater than the cross-sectional dimension of said openings.

11. Apparatus according to claim 7, wherein said openings in said seat are arranged radially at least in their lower extremities.

12. Apparatus according to claim 7, wherein said valve seat and said valve plate have contacting surfaces coated with a sealing material.

* * * * *